Patented Mar. 16, 1937

2,073,827

UNITED STATES PATENT OFFICE 2,073,827

APPARATUS FOR PRODUCING DEHYDRATED AND CRYSTALLINE ANHYDROUS SODIUM TETRABORATE

Leroy G. Black, Trona, Calif., assignor to American Potash & Chemical Corporation, Trona, Calif., a corporation of Delaware Application March 7, 1931, Serial No. 520,970

12 Claims. (Cl. 23—277)

This invention relates to an apparatus for dehydrating hydrated sodium tetraborates in order to produce anhydrous crystalline sodium tetraborate.

This application is a division of my copending application filed March 7, 1931, Serial No. 520,969.

The ordinary borax of commerce

$(Na_2B_4O_7.10H_2O)$ contains a large water content and in marketing such borax an appreciable element of cost is the freight charge due to the necessity of shipping this water of crystallization. For certain purposes it is also desired that a water-free anhydrous borax be provided. Heretofore, when borax has been dehydrated generally a product known as borax glass has been produced. This product has the disadvantage in that it is extremely difficult to drive out the last water of crystallization and the product is extremely hard and very difficult to grind.

The hardness characteristic of borax glass has, to the knowledge of the present inventor, no advantage in subsequent uses but has resulted in several rather serious disadvantages. In the first place, in order to comminute the product, extremely heavy equipment has been required and the upkeep on this equipment has been a large factor in determining the costs of anhydrous borax production. In addition to this undesirable feature of high maintenance on grinding equipment, the borax glass when ground seriously abrades the steel grinding surfaces and a considerable amount of undesirable iron (both in the form of scale and solid metallic particles) has found its way into the resultant products. Such contamination is undesirable in certain instances such as where anhydrous borax is to be used in the enamelling and glass making industries. A further disadvantage of the hard nature of vitreous borax produced by past practice is that it is difficult to comminute the same to a particular desired screen size. If borax glass is sufficiently ground in the average mill to eliminate the undesirable over-sized material, then considerable undesirable under-sized material invariably results.

It is the general object of the present invention to produce an anhydrous borax which is crystalline in form and friable or easily comminuted. It has been discovered that, by proper control of the dehydration of borax or other hydrated tetraborates, when the borate compound approaches the anhydrous state but before it reaches a completely anhydrous state, it can be caused to crystallize entirely as anhydrous borax in a friable, easily comminuted form at the same time driving out of the mass being dehydrated the last trace of water which is ordinarily so difficult to remove in the process of producing borax glass.

It is a further object of the present invention to provide an anhydrous borax which may be comminuted or ground without serious abrading of the grinding surfaces of the grinding equipment so that the resulting product will be substantially free of iron, and it is a further object of the present invention to produce a crystalline anhydrous borax which may be comminuted to a particular screen size without producing an appreciable quantity of over-sized or under-sized material.

The present invention therefore includes an apparatus for producing anhydrous borax by which borax can be reduced to a completely anhydrous state in a more simple and economical manner. The present invention also provides an apparatus by which an anhydrous borax may be produced which is more readily comminuted.

The present invention together with various additional objects and advantages thereof will best be understood from the description of a preferred form of an apparatus for producing crystalline anhydrous borax embodying the present invention.

The apparatus of the present invention will be most clearly understood from the description of a preferred form or example of an apparatus embodying the invention.

Figure 1:
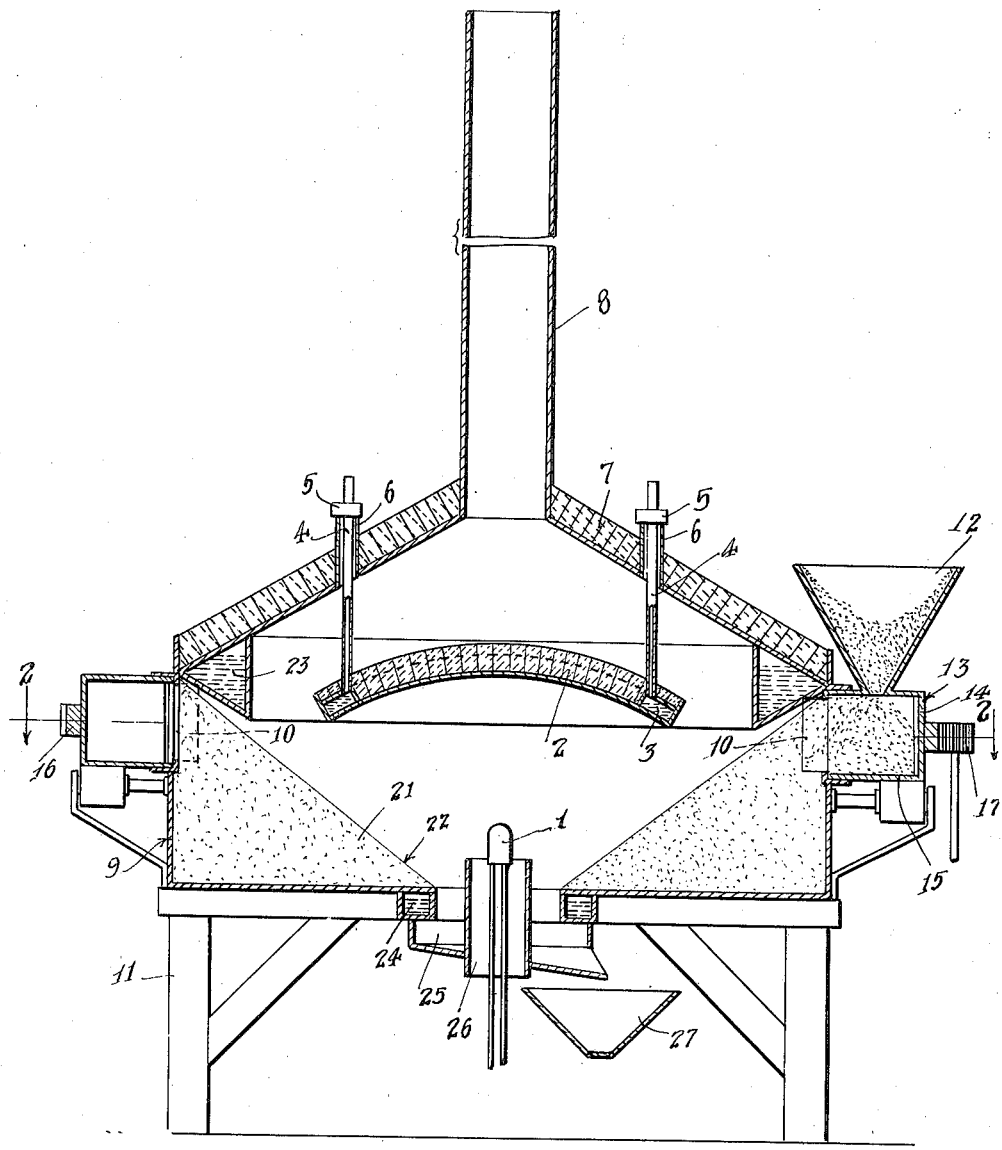
Figure 1 is an elevation mainly in vertical section.
Figure 2:
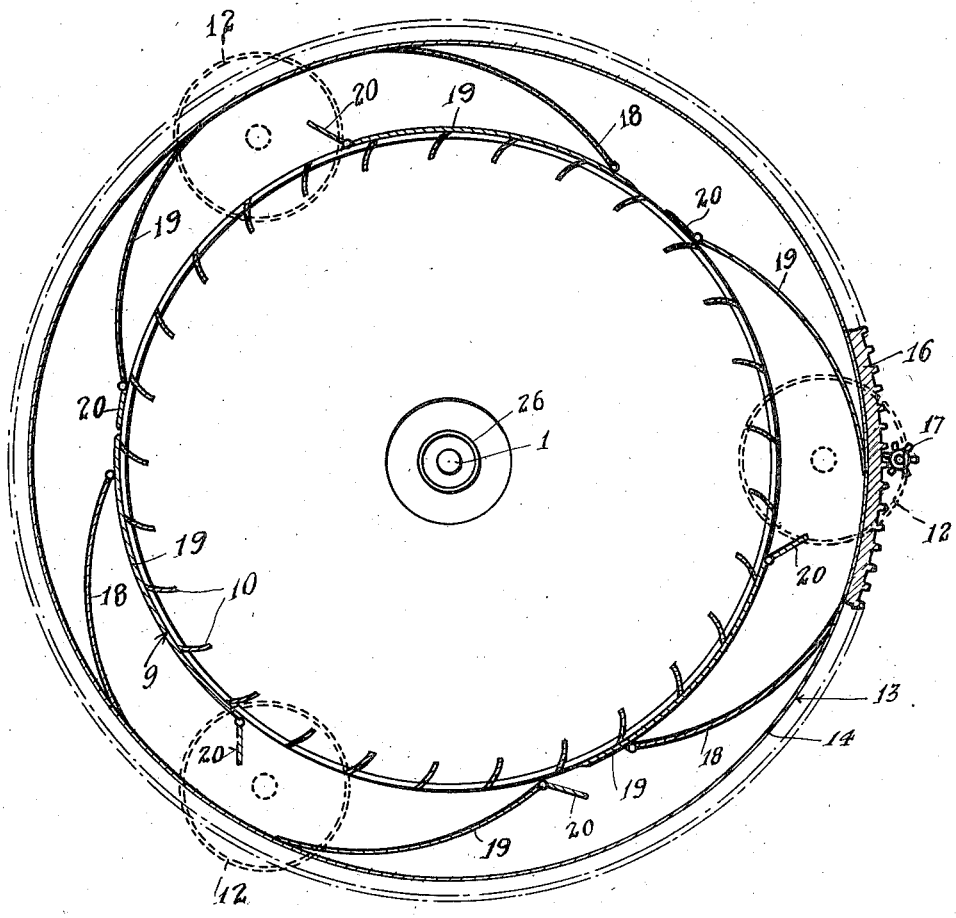
Figure 2 is a horizontal section mainly along the line 2—2.

In the preferred manner of operating the apparatus a hydrated tetraborate compound is subjected to dehydration by heating the compound in a suitable furnace. While in certain cases it may be desired to introduce the ordinary borax or sodium tetraborate dekahydrate, any of the partially hydrated tetraborates may be employed. It is preferred in the process to charge into the furnace a hydrated tetraborate corresponding to the monohydrate.

In the dehydrating furnace the hydrated tetraborate is heated to drive off the water of hydration until it has been sufficiently dehydrated as to reach a molten condition and it may be heated to somewhat higher temperatures in operation. At the time the borate compound reaches the molten state, all but a minor amount of water has been driven off. The remaining traces of water are removed with extreme difficulty and in ordinary practice a pool of the molten borate material is subjected to a high temperature for substantial periods of time in order to drive out the residual water and as a result there is finally produced a product known as borax glass which has no crystalline structure and which is extremely hard and dense. This product can be comminuted or ground only with extreme difficulty and with a high cost for depreciation of the grinding apparatus.

In accordance with this invention, substantially as soon as the borate material has been reduced to the molten condition and rendered fluid or readily pourable it is run out of the furnace into molds wherein it is permitted to cool. It has been found that when the fluid borate material is poured into molds in this condition and permitted to cool it simultaneously crystallizes and the residual water of hydration causes the mass to expand, producing a somewhat porous mass of crystals of anhydrous borax which is apparently entirely free of water.

The crystalline anhydrous borax thus produced is what may be termed in a "friable" state, that is, it is easily broken up and may be broken up by the hand into relatively small borax crystals such, for example, as would be retained between the 20 and 150 mesh screens, i. e., of the average size from 0.833 mm. to 0.104 mm.

In operating the furnace for the production of the crystalline anhydrous product, it is important that one avoids subjecting the molten borax to the high temperature for long periods of time. For this reason I operate the furnace in such manner as to retain a relatively small charge undergoing treatment therein and feed the material continuously into the furnace and continuously remove the same.

I have also found it an advantage to utilize the borate material itself as a protection or lining for the furnace walls. In running the molten borax into molds for crystallizing I prefer to employ a mold which expands upwardly in order to permit the free expansion of the material in the crystallizing operations.

Now referring particularly to the drawings, 1 represents a burner which may be any usual or preferred burner, preferably utilizing fluid fuels such as oil or gas. This burner projects a flame against a refractory brick arch 2 which arch is protected from erosion by water jacket 3 and is suspended by a number of water-cooled tubes 4. Preferably means are provided by which the position of the refractory arch 2 in the furnace may be adjusted, such as nuts 5 having bearing on the reinforced section 6 of a refractory cone top wall 7 of the furnace. A flue 8 is provided in the apex of the top wall of the furnace and is supported thereby.

The refractory brick cone 7 providing the top wall of the furnace is supported through side walls 9 of the furnace which may be of metal or brick and which are preferably cylindrical in form. The side walls 9 have a plurality of feeding ports and vanes 10. The entire furnace is supported on the frame 11 which may take any desired form.

A plurality of feeding hoppers 12 are provided, preferably three in number, of which one appears in Figure 1. These feeding hoppers in practice are filled with borate material which is to be dehydrated and crystallized and permits this material to flow by gravity into a rotating feeder 13. The feeder 13 comprises a perpendicular outer wall 14 and an annular bottom wall 15, the inner wall being opened for communication with the feeding ports in the sidewalls 9 of the furnace. The outer wall 14 of the feeder is provided with a gear 16, by means of which it may be driven by the pinion 17.

The feeder 13 is also provided with force feeding vanes 18. These vanes are attached at one end to the outer side walls of the feeder and curved inwardly to the inner edge of the feeder and are fixed in position by being welded or otherwise secured to the bottom walls 15 of the feeder.

The side wall of the feeder has a plurality of doors 19, each of which is adapted to close a plurality of ports leading to the furnace chamber and the doors are pivoted to the side walls and provided with operating extensions 20 which are adapted for engagement with the force feeding vanes 18 of the feeder to be opened thereby during the motion of the feeder 13. The doors 19 in operation are opened and closed as follows: The rotation of the forced feeding vanes 18 contact the outer ends of the doors 19 and push these inwardly thereby closing the doors 19. When the inner ends of the vanes 18 reach the extensions 20 of the doors 19, the extensions 20 are then forced inwardly, pivoting the doors 19 so that they again open.

After entering the furnace, the borate material builds up a bed 21 in the shape approximating an inverted cone eventually reaching the angle of repose of the material as shown by the surface 22. The furnace is now ready for continuous operation.

As further borate material is fed or charged into the furnace it is protected from the hot gases within the furnace for a short time by a water jacket 23, after which it passes by gravity into the melting zone. The borate material being melted in the furnace passes rapidly down over a water jacket 24 into a collector 25 which has a vertical tube 26 and a bottom wall which inclines towards a mold 27.

The furnace is operated so as to maintain continuously the embankment of borate material 21 and only a small amount of material in the furnace reaches a molten condition at one time. This insures that the material, as soon as it reaches a molten condition, will be rapidly discharged from the furnace, preventing baking of the same for protracted periods of time. Apparently, the avoidance of prolonged heating of the borate material after it has reached the molten condition is an important element in securing crystallization of the anhydrous borax. It also appears that by melting the borate material as herein described and passing the borate material immediately out of the melting zone and having the molten material in contact with unmolten semi-dehydrated borate material 21, there is induced in the molten mass certain crystal nuclei originating from the semi-dehydrated raw material. These crystal nuclei induce rapid crystallization of the mass after they have been withdrawn from the furnace.

In operation of the apparatus of the present invention the slope 22 of the bed 21, the degree of firing and the rate of feed are adjusted so that the material leaving the furnace will obtain a satisfactory fluidity but will not have been unduly heated or maintained at high temperatures over long periods of time. In this feature the melting furnace of the present invention differs materially from the furnaces of past practice, wherein a pool of molten material is held at high temperatures for prolonged periods.

The crystalline anhydrous borax produced by the process of this invention when crushed and sacked has a weight of approximately 150 pounds per sack as compared with a weight of 115 pounds which results when common borax (sodium tetraborate dekahydrate) is sacked. Moreover, in comparison with the dekahydrate a sack of the crystalline anhydrous borax contains approximately 150 pounds of NaB₄O₇ as compared with 60.5 pounds of Na₂B₄O₇ in a sack of sodium tetraborate dekahydrate.

The crystallization of the molten borax apparently takes place at or just below the melting point. It is preferred in the crystallizing operation that the cooling be conducted relatively slowly in order to prevent the formation of glass. It also appears that the crystallizing operation will not always take place spontaneously. Generally, the mass may be caused to crystallize by agitation, particularly when the mass is seeded in any way. I generally do not find that it is necessary to add seeds of borax crystals to the mass, for the crystallization will be caused to take place on account of seeding from borax dust in the atmosphere or from the furnace.

While in certain cases it may be desirable to subject the molten material which is undergoing slow cooling to mechanical agitation in order to start the crystallization, in other cases the crystallization may be started without mechanical agitation due to seeding of the mass either from the air or from the residual crystals of anhydrous sodium tetraborate remaining in the molds, or added deliberately. Where crystallization is permitted to start from seeding of the mass either from seeds deliberately added or otherwise brought into contact with the mass, sufficient agitation to cause complete crystallization of the entire mass is generally secured due to the agitating effect of the final water from the mass which is liberated in the crystallizing operation and agitates the mass by expanding the same.

Since the crystallization of the molten borax takes place at or close to the melting point, it has been found that the crystallization operation is facilitated by having the borate material very close to the melting point when it is run into the molds. Then there is present a large body of molten material to be crystallized and this material is just at the melting point or temperature of crystallization. Once crystallization commences the whole mass will rapidly undergo crystallization; whereas, if the material is at too high a temperature, when run into the molds, crystallization may be difficult to effect and in some cases borax glass will result.

After crystallization sets in within the molten mass there are produced anhydrous sodium tetraborate crystals and the crystallization of the entire mass becomes complete in less than an hour. I have discovered that these anhydrous sodium tetraborate crystals are hydrophobic, that is, they will not tolerate any water in their crystal structure. Consequently, as the material crystallizes the residual water of the molten mass is liberated. This liberation of water is instrumental in effecting the desired production of a friable crystalline anhydrous borax.

Since crystallization takes place at a relatively high temperature (about 720° C.) the water liberated at this temperature must exist in the vapor phase. The liberation of this water tends to stir the crystallizing molten magma to a considerable extent and results in the production of an extremely friable aggregate. However, the anhydrous sodium tetraborate crystals are not in any way porous, but on the contrary, comprise a more dense material than the corresponding borax glass. The stirring action of the water liberated from crystallization of the anhydrous borax not only serves the afore-described valuable purpose but likewise plays an important role in insuring complete crystallization. If an attempt is made to crystallize borax from a molten mass which has been completely dehydrated, not only is crystallization difficult to commence but the product comprises densely matted clusters of very minute needles. The development of these crystals is slow so that many hours are occupied in their formation. Furthermore, a great part of the mass remains as borax glass after the completion of the operation.

The crystallization of anhydrous sodium tetraborate has been found to be rather strongly exothermic. As a result the molten magma in which crystallization may commence at or below 720° C. may easily be maintained in a plastic state until crystallization has been completed. By preventing undue radiation losses from the molds or like equipment very little difficulty is encountered in entirely preventing the formation of a vitreous product, thereby insuring complete crystallization of the entire mass.

One explanation as to why the crystallization process of the present invention is so complete while other methods of crystallizing anhydrous sodium tetraborate produce an incompletely crystallized product may reside in the fact that the water present in the mass undergoing crystallization tends to compensate for the heat of crystallization and keep the mass undergoing crystallization at the optimum crystallizing temperature. It appears that crystallization of the mass best proceeds at a temperature commencing at about 720° C. If there were no water in the mass undergoing crystallization the heat of crystallization would raise the temperature of the mass rapidly above this temperature. When there is a residual water of hydration in the mass undergoing the crystallization operation the heat of vaporization of this water compensates for the heat of crystallization and tends to maintain the desired optimum crystallizing temperature.

Nearly all borax of commerce contains rather minute quantities of organic matter and this organic matter, unless completely consumed in the heating operations, results in a darkened product which is rather unpleasing to the eye. However, by the method of this invention there is produced a crystalline product which of itself very materially masks the dark color. In order to obtain a product of absolute whiteness at the relatively low temperatures employed in this process, I have found it advantageous to introduce with the raw material entering the fusion furnace a minute quantity of a suitable oxidizing agent. One of the most suitable materials from the standpoint of effectiveness and cheapness has been found to be sodium nitrate. The addition of 0.01% to 0.10% commercial sodium nitrate has been found to be an excellent medium for producing a snow-white crystalline anhydrous sodium tetraborate.

While the particular form of invention herein described is well adapted to carry out the objects of the invention, various modifications and changes may be made without departing from the spirit of the invention, and the invention is of the scope set forth in the appended claims.

I claim:

1. A reverberatory furnace comprising in combination, a reaction chamber, an inlet port near the top and sides of the reaction chamber, an outlet port centrally disposed in the bottom of said chamber, means for feeding raw material through said inlet port to form a sloping embankment to said outlet port, a radiating arch suspended within the reaction chamber and above the outlet port, and a fuel burner disposed within the outlet port whereby heat therefrom is projected toward said arch and radiated therefrom to said embankment.

2. A furnace comprising a reaction chamber formed by top, bottom and sidewalls and having an outlet located in the floor between the sidewalls and a substantially continuous inlet aperture for the charging of raw material, means for forcibly introducing raw material through said aperture to form a pile of charged material covering the aperture and extending therefrom toward the outlet, and means for applying heat to the surface of the pile.

3. A furnace comprising a reaction chamber formed by top, bottom and sidewalls and having an outlet located in the floor between the sidewalls and a substantially continuous inlet aperture for the charging of raw material, means for forcibly introducing raw material through said aperture to form a pile of charged material covering the aperture and extending therefrom to the outlet the relative spacing of the aperture and the outlet being such that the slope of said pile will be substantially equivalent to the angle of repose of the charged material, and means for applying heat to the surface of the pile.

4. A furnace for fusing solids comprising a reaction chamber having an outlet centrally located in the floor thereof, a substantially continuous inlet aperture for charging of raw material, including a plurality of contiguous inlet ports in the sidewalls thereof, the arrangement of outlet and inlet ports being such that material fed in at the ports will form a heap sealing said ports and extending therefrom toward the outlet with a slope at least as small as the angle of repose of the material, means for continually forcibly feeding material through said ports, and means for applying heat to the surface of said heap to cause fusion thereon.

5. A reverberatory furnace comprising a fusion chamber having an outlet and a plurality of substantially contiguous inlet ports around the upper part of said chamber, a traveling feed hopper rotatably mounted on the outside of said chamber to feed material through said ports in continuous succession, means actuated in synchronization with the movement of the hopper for closing said ports succeeding the introduction of material therethrough and pending subsequent introduction of material, and heating means for melting material introduced into the furnace.

6. A reverberatory furnace comprising a fusion chamber having an outlet and a plurality of inlet ports spaced around the upper part thereof, a traveling hopper for charging raw material through said inlets, means for continuously bringing said hopper into charging relationship with said ports in succession, a plurality of movable members disposed normally to close the ports, means for removing the members to open the ports preceding the movement of the hopper into charging relationship therewith and returning the members to close the ports upon the passage of the hopper out of charging relationship with the ports, and means for heating the charged material.

7. A reverberatory furnace comprising an annular fusion chamber having an outlet port and a plurality of inlet ports disposed peripherally around the upper part thereof, a traveling feed hopper rotatably mounted in feeding relationship with said ports, closure members pivotally mounted on the exterior of the chamber each covering a plurality of inlet ports, an arcuate member mounted to rotate with the hopper in fixed relation behind the same, means for opening the inlet ports pending the movement of the hopper into feeding relationship thereto, and drive means for bringing said hopper into feeding relationship with the ports in continuous succession whereby the charged material is forced into the chamber through the combined action of the closure and arcuate members.

8. A reverberatory furnace comprising a fusion chamber having an outlet port and a plurality of spaced peripheral inlet ports, a traveling feed device for forcibly introducing material through said ports in succession, closure means for sealing each port following the introduction of material therethrough, and means for heating the charged material in the chamber.

9. A furnace comprising a reaction chamber formed by side walls and floor, having an outlet located centrally in said floor and a plurality of peripheral inlets located in the side walls and forming a substantially continuous inlet aperture for the charging of raw material, means for introducing raw material through said inlets to form a pile of charged material covering the inlet aperture, and means for applying heat to the surface of said pile.

10. An apparatus for dehydrating hydrated sodium tetraborate, which comprises a reaction chamber, the bottom wall having a discharge opening positioned so as to be at the foot of the sloping embankment of hydrated sodium tetraborate material placed against the side walls of the reaction chamber, and a water jacket constituting a continuation of said opening, means for feeding hydrated sodium tetraborate to the embankment of material within said reaction chamber, and means within the reaction chamber for radiating heat against such embankment.

11. A furnace for dehydrating hydrated sodium tetraborate, which comprises a reaction chamber including a floor and side walls, means near the upper end of the side walls for feeding to the reaction chamber hydrated sodium tetraborate to form an embankment thereof within the reaction chamber, an outlet for molten material in the floor of said chamber positioned to be at the foot of the embankment, a water jacket for said floor surrounding said outlet, and means for fusing material on the surface of said embankment.

12. A furnace for dehydrating hydrated sodium tetraborate, comprising a reaction chamber including a metallic floor and metallic side walls and a brick top wall, an inlet provided near the top of the side walls for introducing hydrated sodium tetraborate into the furnace so as to form a sloping embankment thereof, an outlet for molten material in the floor of said furnace positioned to be at the foot of said embankment, means for fusing material on the surface of said embankment, and a water jacket around the outlet in said floor.

LEROY G. BLACK.